Patented Jan. 10, 1939

2,143,721

UNITED STATES PATENT OFFICE 2,143,721

PROCESS AND COMPOSITION FOR IMPROVING RUBBER COMPOUNDS

Harold A. Sweet, Westfield, N. J., assignor to General Dyestuff Corporation, New York, N. Y., a corporation of New York No Drawing. Application May 21, 1936, Serial No. 81,015

8 Claims. (Cl. 18—50)

This invention relates to a process and a composition for improving rubber compounds.

It is an object of this invention to provide a process and a composition for inhibiting the sun checking of rubber.

It is also an object of this invention to provide a process and a composition whereby the compounding of the rubber mix in the mill is facilitated.

Further objects of my invention are to provide a process and composition which serves to plasticize, improve the ageing properties and increase the resistance to flex cracking, fatigue or elongation of rubber compounds.

It is known that the addition of small amounts of paraffin wax or montan wax to rubber compounds tends to inhibit sun checking thereof. These materials, however have the objectionable property of migrating to the surface of the rubber article yielding a "bloom" or matte appearance to the article which is undesirable. Furthermore these materials accumulate on the surface of the article forming a scale. Of course removal of the paraffin wax or Montan wax from the rubber compound destroys the sun checking inhibiting action of these materials and thereafter the rubber will deteriorate in the same manner as if the addition had not been made.

I have found that the addition of a small amount, generally less than 5%, of waxy, polymeric ethers obtained by polymerizing monomeric vinyl ethers of the general formula $CH_2=CH-O-R$ wherein R is an aliphatic radical of from about 10 to about 35 carbon atoms to rubber compounds effectively inhibits sun checking of the rubber compound. The waxy, polymeric ethers which I use possess the surprising advantage over paraffin wax or montan wax that they do not migrate to the surface of the rubber article and therefore do not detract from the appearance thereof and due to the retention of these materials in the rubber article, its resistance to sun-checking remains undiminished. Rubber compounds containing such waxy, polymeric ethers are distinguished by the ease with which they are worked in the mill and the resultant products possess good ageing properties, and high resistance to flex cracking, fatigue and elongation.

The polymeric ethers which I use are those obtained by polymerizing the monomeric vinyl ethers of the general formula $CH_2=CH-O-R$ wherein R is an aliphatic radical of from 10 to 35 carbon atoms by a treatment with a substantially anhydrous inorganic acid reacting condensing agent at temperatures between 10° C. and 100° C. Suitable condensing agents are, for example, sulphuric acid, phosphoric acid, hydrochloric acid, hydrofluoric acid, tin tetrachloride, stannous chloride, aluminum chloride or sulphate, iron chloride, zinc chloride, boron hydrofluoride, silicon tetrachloride mercury chloride, sodium bisulfate, potassium bisulphate or alum. The quantity of condensing agent employed is generally between 0.001 and 5% of the weight of the ether employed.

The monomeric ethers that I use are preferably those corresponding to the general formula $CH_2=CH-O-R$ wherein R stands for the radical of long chain aliphatic alcohols such as those corresponding to the saturated or unsaturated fatty acids containing from about 10 up to about 35 carbon atoms, as for example those corresponding to the acids of fats and waxes of animal or vegetable origin, such as decyl, dodecyl, tetradecyl, cetyl, docosanyl, octodecyl or octodecenyl alcohols or vinyl ethers with "montanol", or the mixture of alcohols corresponding to the mixture of acids in montan wax. I prefer the vinyl ethers of alcohols containing from 10 to 20 carbon atoms, particularly of alcohols containing 16-18 carbon atoms. These monomeric vinyl ethers may be obtained, for example, in the manner described in U. S. Patent 1,959,927.

I intend by the term waxy, polymeric vinyl ethers used herein, to include polymers obtained by polymerizing the monomeric vinyl ethers as described above and also mixtures of two or more of such polymers.

The waxy, polymeric vinyl ethers may be incorporated in the rubber mix by finely dividing the same and mixing them with the other ingredients to be added to the rubber compound and thereafter working the same in a mill in the usual manner.

The waxy, polymeric vinyl ethers may be used in varying amounts up to about 5% of the weight of the total rubber compound, 0.2% to about 4% being the preferred range.

The following example is given in order to further illustrate my invention but it is not intended to limit my invention thereto.

*Example*

| | |
|---|---|
| Smoked sheets | 100.00 |
| Carbon black | 45.00 |
| Coal tar softener | 5.00 |
| Zinc oxide | 5.00 |
| Antioxidant | 1.50 |
| Waxy, polymeric vinyl ether | 1.50 |
| Stearic acid | 4.00 |
| Sulphur | 3.00 |
| "Captax" (mercapto type accelerator) | 0.75 |
| | 165.75 |

The above is a typical tire tread formula. Upon exposure for three months, rubber sheets made from the above formula showed no signs of sun checking.

It is to be understood that the several ingredients in the above formula and the amounts thereof may be varied at will, depending upon the use to which the compound is to be put, and other materials may be included or substituted therein. For example, any suitable softener may be used in place of the coal tar softener and it is possible to substitute other accelerators for "Captax", which is principally mercaptobenzothiazole. Another accelerator which has been used with considerable success in rubber compounds containing waxy, polymeric vinyl ethers is "Altax" which is principally benzothiazyldisulphide.

While I do not wish to be limited to this particular theory, I believe that a reaction occurs between the waxy, polymeric vinyl ethers and the accelerator, particularly with mercaptobenzothiazole and with benzothiazyldisulphide.

Rubber compounds containg waxy, polymeric vinyl ethers as described above have been found very useful for covering wire in which use the rubber compound is subject to extremely severe attack by sunlight and the elements in general.

I claim:

1. The process of compounding rubber which comprises adding to the rubber compound an amount of a waxy, polymeric vinyl ether which is obtained by polymerizing the monomeric vinyl ethers of the general formula $CH_2=CH-O-R$ wherein R is an aliphatic radical of from 10 to 35 carbon atoms which is less than 5% of the total rubber compound and thereafter vulcanizing said compound.

2. The process of compounding rubber which comprises adding 0.2% to 4.0% of a waxy, polymeric vinyl ether which is obtained by polymerizing the monomeric vinyl ethers of the general formula $CH_2=CH-O-R$ wherein R is an aliphatic radical of from 10 to 35 carbon atoms to the rubber compound and thereafter vulcanizing said compound.

3. The process of compounding rubber which comprises reducing a waxy, polymeric vinyl ether which is obtained by polymerizing the monomeric vinyl ethers of the general formula $$CH_2=CH-O-R$$

wherein R is an aliphatic radical of from 10 to 35 carbon atoms to a finely divided form, mixing the same with a vulcanization accelerator of the mercapto type, and with the usual filling materials, pigments, sulphur, antioxidants and softeners, incorporating such mixture into the rubber by passing the mixture and rubber through the rollers of a mill and thereafter vulcanizing the rubber compound.

4. A rubber compound containing less than 5% of a waxy, polymeric vinyl ether which is obtained by polymerizing the monomeric vinyl ethers of the general formula $CH_2=CH-O-R$ wherein R is an aliphatic radical of from 10 to 35 carbon atoms.

5. A rubber compound containing 0.2–4.0% of a waxy, polymeric vinyl ether which is obtained by polymerizing the monomeric vinyl ethers of the general formula $CH_2=CH-O-R$ wherein R is an aliphatic radical of from 10 to 35 carbon atoms.

6. A rubber article obtained by vulcanizing a rubber compound containing rubber, sulphur, an accelerator of the mercapto type, the usual antioxidants, softeners, pigments and filler materials and from 0.2% to 4% of a waxy, polymeric vinyl ether which is obtained by polymerizing the monomeric vinyl ethers of the general formula $CH_2=CH-O-R$ wherein R is an aliphatic radical of from 10 to 35 carbon atoms.

7. A rubber compound containing 0.2–4.0% of the waxy, polymeric ether which is obtained by polymerizing the monomeric vinyl ether of the formula $CH_2=CH-O-C_{18}H_{37}$.

8. A rubber article obtained by vulcanizing a rubber compound containing rubber, sulphur, an accelerator selected from the group consisting of mercaptobenzothiazole and benzothiazyl disulfide, the usual antioxidants, softeners, pigments and fillers and from 0.2% to 4.0% of the waxy, polymeric ether which is obtained by polymerizing the monomeric vinyl ether of the formula $$CH_2=CH-O-C_{18}H_{37}$$

HAROLD A. SWEET.